United States Patent
Farmer et al.

(10) Patent No.: US 10,457,291 B1
(45) Date of Patent: Oct. 29, 2019

(54) VEHICLE POWERTRAIN LASH CROSSING CONTROL STRATEGY

(71) Applicant: FORD GLOBAL TECHNOLOGIES, LLC, Dearborn, MI (US)

(72) Inventors: Mary Catherine Farmer, Plymouth, MI (US); Dennis Craig Reed, Dexter, MI (US); Peter Douglas Kuechler, Canton, MI (US); Terry Gene Feldpausch, Carleton, MI (US); Mitchell Thomas Fink, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 15/965,293

(22) Filed: Apr. 27, 2018

(51) Int. Cl.
*B60W 30/20* (2006.01)
*B60W 40/06* (2012.01)

(52) U.S. Cl.
CPC ............ *B60W 30/20* (2013.01); *B60W 40/06* (2013.01); *B60W 2720/00* (2013.01)

(58) Field of Classification Search
CPC ...... B60W 30/20; B60W 40/06; B60W 10/04; B60W 10/10
See application file for complete search history.

(56) References Cited

U.S. PATENT DOCUMENTS

| | | | |
|---|---|---|---|
| 8,359,144 B2 | 1/2013 | Morris et al. | |
| 8,733,183 B1 | 5/2014 | Yanakiev et al. | |
| 2007/0213909 A1* | 9/2007 | Doering | F02D 41/0002 701/54 |
| 2008/0254940 A1* | 10/2008 | Stoffels | B60K 6/442 477/107 |
| 2010/0114424 A1* | 5/2010 | Morris | B60W 30/20 701/51 |
| 2016/0102757 A1 | 4/2016 | Ye et al. | |

* cited by examiner

*Primary Examiner* — Edwin A Young
(74) *Attorney, Agent, or Firm* — David Kelley; Brooks Kushman P.C.

(57) ABSTRACT

A vehicle includes a powertrain and a controller. The powertrain includes a powerplant. The controller is programmed to, responsive to a tip-in resulting in a powertrain torque direction reversal and upon obtaining a base value of a desired powertrain lash angle, adjust a powerplant torque schedule. The controller is then subsequently programmed to adjust the desired powertrain lash angle from the base to an adjusted value based on an observed powertrain lash angle that corresponds to a maximum powertrain acceleration during the tip-in.

20 Claims, 5 Drawing Sheets

VEHICLE POWERTRAIN LASH CROSSING CONTROL STRATEGY

TECHNICAL FIELD

The present disclosure relates to vehicle powertrains and more specifically to control strategies during a powertrain lash crossing.

BACKGROUND

Control strategies may be utilized to smooth the transition from negative to positive torque within the powertrain, or vice versa, during a lash crossing.

SUMMARY

A vehicle includes a powertrain and a controller. The powertrain includes a powerplant. The controller is programmed to, responsive to a tip-in resulting in a powertrain torque direction reversal and upon obtaining a base value of a desired powertrain lash angle, adjust a powerplant torque schedule. The controller is then subsequently programmed to adjust the desired powertrain lash angle from the base to an adjusted value based on an observed powertrain lash angle that corresponds to a maximum powertrain acceleration during the tip-in.

A method includes increasing powertrain torque according to an anti-jerk schedule in response to a tip-in resulting in a torque direction reversal in a vehicle powertrain, adjusting the powertrain torque from the anti-jerk schedule to a driver demanded torque in response to obtaining a desired powertrain lash angle, and adjusting the desired powertrain lash angle during a subsequent tip-in based on an observed powertrain lash angle that corresponds to a maximum powertrain acceleration observed during the tip-in.

A method includes signaling an end of a lash crossing in response to a desired powertrain lash angle obtaining a base value during a tip-in, adjusting the desired powertrain lash angle from the base to an adjusted value based on a maximum powertrain acceleration observed during the tip-in, and signaling the end of the lash crossing responsive to the desired powertrain lash angle obtaining the adjusted value during a subsequent tip-in.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
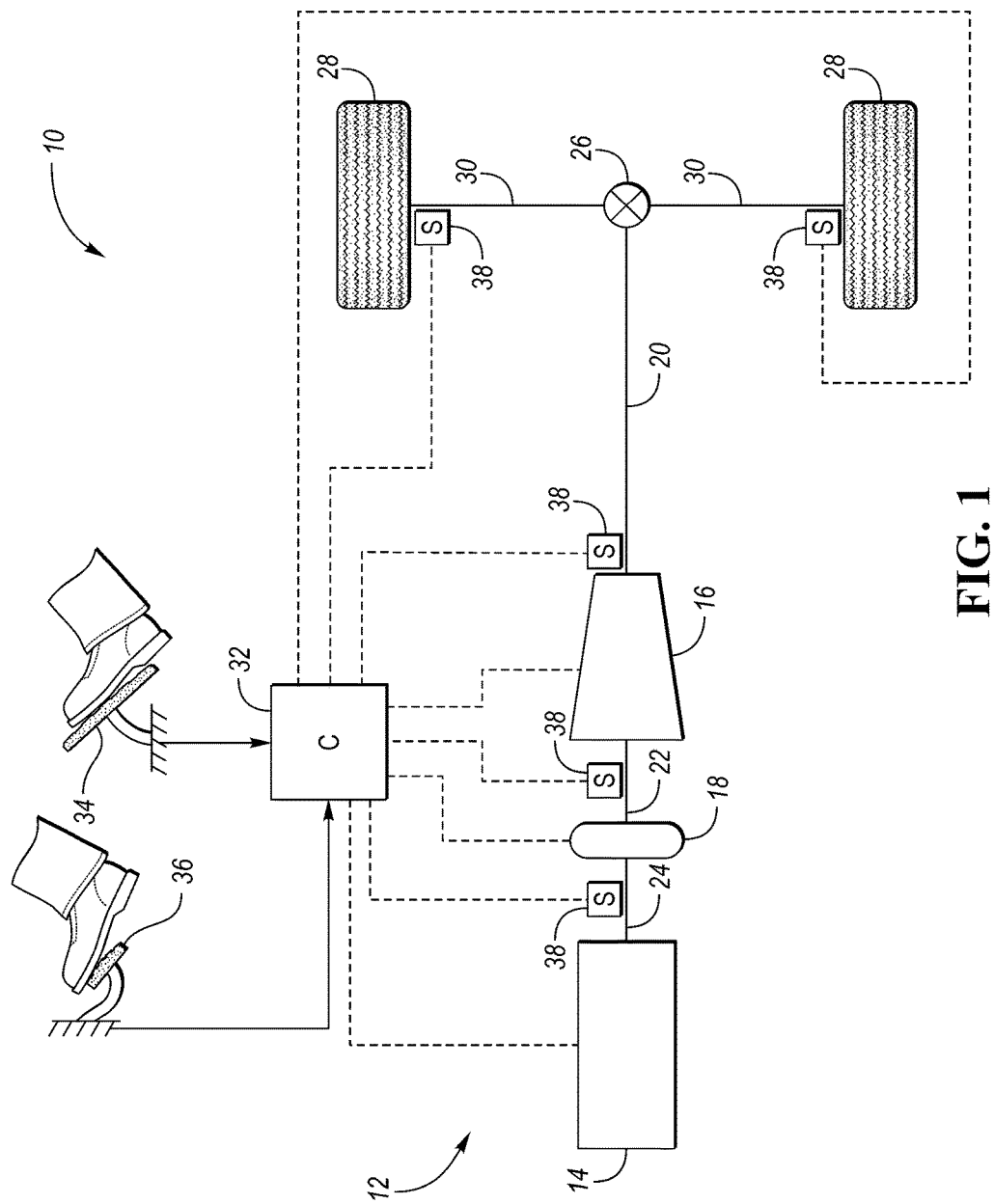
FIG. 1 is a schematic illustration of a representative vehicle and vehicle powertrain.

Referring to FIG. 1, a schematic diagram of a vehicle 10 and vehicle powertrain 12 is illustrated according to an embodiment of the present disclosure. FIG. 1 illustrates representative relationships among the components. Physical placement and orientation of the components within the vehicle may vary. The powertrain 12 includes a powerplant 14 that drives a transmission 16. The transmission 16 may be placed in PRNDSL (park, reverse, neutral, drive, sport, low) via a transmission range selector. The powerplant 12 may be internal combustion engine, an electric motor that is powered by a battery or a generator, or any other device that is capable of generating power and torque within the powertrain 12. Although not shown, the vehicle may be a hybrid vehicle that includes multiple powerplants that are configured to generate torque and power within the powertrain 12. For example, the vehicle may include both an engine and an electric machine. A transmission input device 18, such as a torque converter or a launch clutch, may connect the powerplant 14 to the transmission 16.

The transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 20 and a transmission input shaft 22. The transmission 16 is automatically shifted from one ratio to another based on various vehicle and ambient operating conditions by an associated controller, such as a powertrain control unit (PCU). Power and torque from powerplant 14 may be delivered to and received by transmission 16. The transmission 16 then provides power and torque to output shaft 20.

The transmission input shaft 22 may be connected the transmission input device 18, which in turn may be connected to a powerplant output shaft 24 (e.g., a crankshaft of an internal combustion engine). However, it should be understood that a hydraulically controlled transmission paired with a torque converter or launch clutch is but one example of a gearbox or transmission arrangement; any multiple ratio gearbox or transmission that accepts input torque(s) from a powerplant and then provides torque to an output shaft at the different ratios is acceptable for use with embodiments of the present disclosure. For example, the transmission may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective half shafts 30 that are connected to the differential 26. The differential transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The powertrain 12 may include additional components that are depicted in FIG. 1. For example, universal joints may be disposed between the shafts and other various components of the powertrain 12.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as starting/stopping the powerplant 14, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or from powerplant 14, transmission 16, transmission input device 18, etc. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (if the powerplant 14 is a spark-ignition engines), intake/exhaust valve timing and duration, front-end accessory drive (FEAD) components such as an alternator, air conditioning compressor, battery charging or discharging (in an embodiment that is an electric or hybrid vehicle), regenerative braking (in an embodiment that is an electric or hybrid vehicle), clutch pressures for various clutches that may be positioned between two or more moving components of the powertrain 12 or within the transmission 16, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, powerplant, and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle 10 to provide a demanded torque, power, or drive command to the powertrain 12 (or more specifically the powerplant 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 36 as a demand to decrease the vehicle speed. Based upon inputs from the accelerator pedal 34 and brake pedal 36, the controller 32 commands the torque and/or power to the powerplant 14 and friction brakes (not shown). Alternatively, the friction brakes may be a mechanical system (e.g., a hydraulic system) that increases the force applied at the friction brakes based on an input force to the brake pedal 36. In the alternative embodiment, the controller 32 will not command the force applied at the friction brakes but may be aware of a magnitude of the force based on a signal input into the controller 32 by a sensor that indicates the position of the brake pedal 36.

One or more sensors 38 may be configured to detect the torque, speed, and/or acceleration at various points along the powertrain 12 and to communicate the magnitude of the detected the torque, speed, and/or acceleration to the controller 32. For example, the sensors 38 may be configured to detect the torque, speed, and/or acceleration at the output of the powerplant (i.e., the powerplant output shaft 24), the input to the transmission (i.e., the transmission input shaft 22), the output of the transmission (i.e., the transmission output shaft 20), or at the wheels 28 (which may be coincide with torques, speeds, and/or accelerations of the adjacent half shafts 30). It should be noted that the powerplant output shaft 24 may also be an input of the transmission input device 18 and that the transmission input shaft 22 may also be an output of the transmission input device 18. It should further be understood that the sensors 38 depicted in FIG. 1 may be representative of a single sensor or of multiple sensors.

The controller 32 may be configured to receive various states or conditions of the various vehicle components illustrated in FIG. 1 via electrical signals. The electrical signals may be delivered to the controller 32 from the various components via input channels. Additionally, the electrical signals received from the various components may be indicative of a request or a command to change or alter a state of one or more of the respective components of the vehicle 10. The controller 32 includes output channels that are configured to deliver requests or commands (via electrical signals) to the various vehicle components. The controller 32 includes control logic and/or algorithms that are configured to generate the requests or commands delivered through the output channels based on the requests, commands, conditions, or states of the various vehicle components. The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2A:
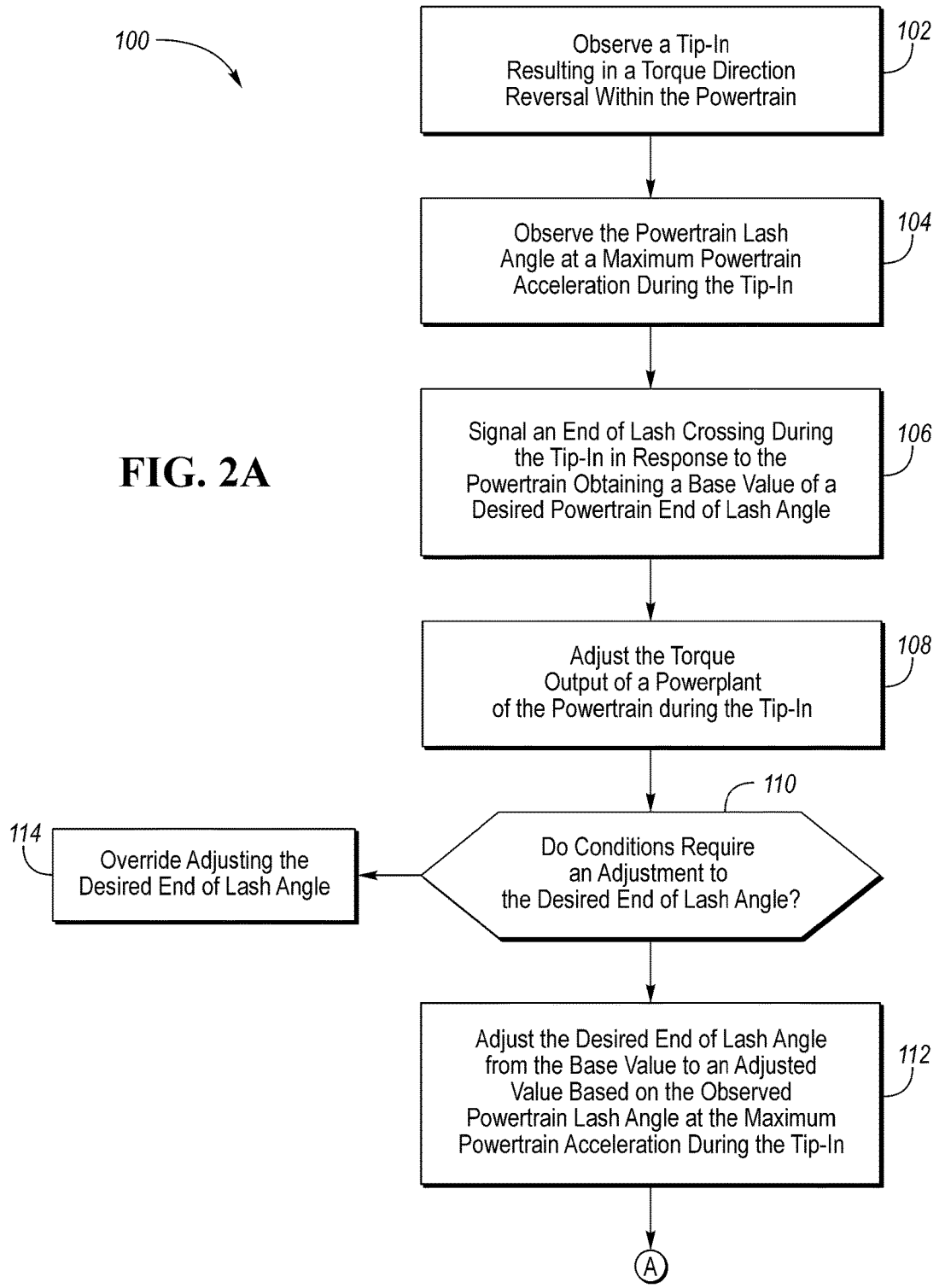
FIGS. 2A and 2B collectively illustrate a flowchart of a lash control strategy for the vehicle powertrain.
Figure 2B:
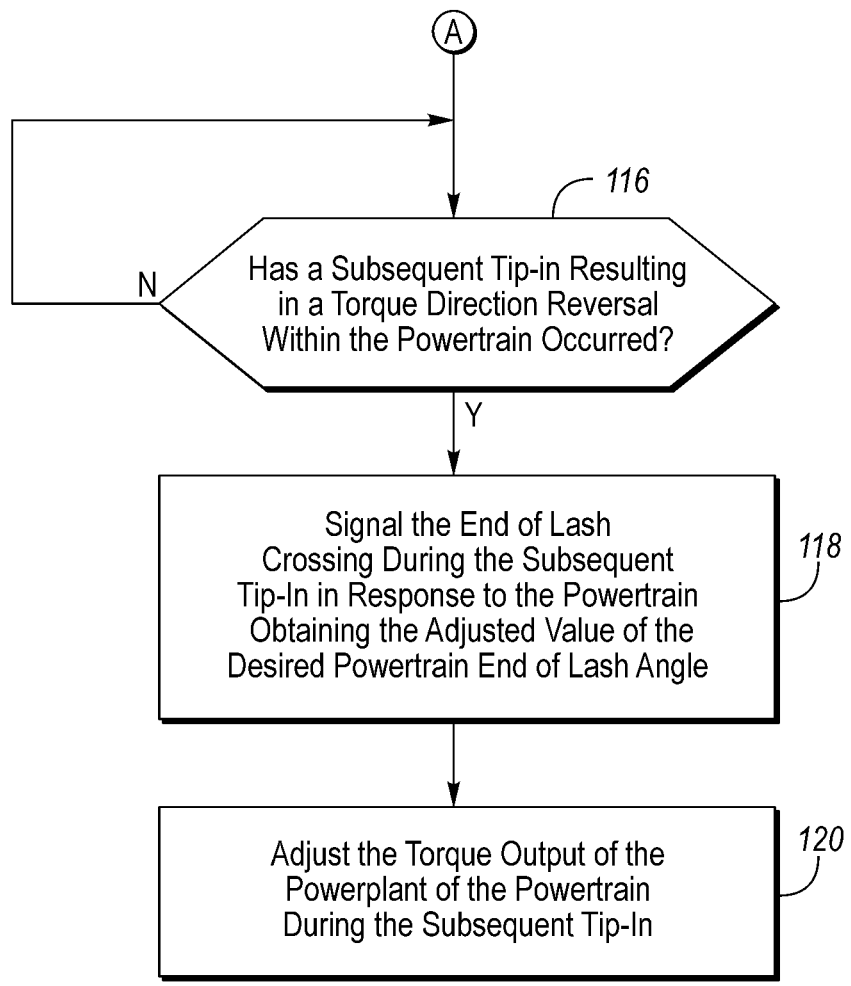

Referring to FIGS. 2A and 2B, a flowchart of a method or lash control strategy 100 for the vehicle powertrain 12 is illustrated. The control strategy 100 may be utilized by any type of vehicle that includes at least one powerplant that is configured to generate torque and power within the powertrain of the vehicle. For simplification purposes, however, the vehicle 10 in FIG. 1 will be referenced while describing the steps of the control strategy 100. The control strategy 100 may be stored as control logic or algorithms in one or more controllers (e.g., controller 32). The one or more controllers may be programmed to implement the control strategy 100 via sending output signals to various components to control the various components based on various conditions or states of the vehicle (or based on the conditions or states of the various subcomponents or subsystems of the vehicle) received by the one or more controllers via input signals.

The control strategy 100 is imitated at block 102 with the observation of a tip-in that results in a torque direction reversal within the powertrain 12 (e.g., an application of the accelerator pedal 34 that results in a torque within the powertrain 12 switching from a negative value to a positive value or an application of the brake pedal 36 that results in a torque within the powertrain 12 switching from a positive value to a negative value). A reversal in torque direction within the powertrain 12 corresponds with a lash crossing that occurs within the powertrain 12. A lash crossing of a powertrain is when the powertrain transitions between producing a positive torque and receiving a negative torque. At a zero-torque transition point between the positive and negative torques the powertrain produces lash when powertrain components, including transmission gears, separate when torque is removed at the transition point before the components resume contact when torque is reapplied. Lash may produce a clunk noise or bump that is perceivable to a vehicle occupant. Lash contributes to noise, vibration, and harshness (NVH) within a powertrain.

Next, the control strategy 100 moves on to block 104, where the control strategy 100 is configured to observe the lash angle within the powertrain 12 during the tip-in. More specifically at block 104, the control strategy 100 is configured to observe the lash angle that corresponds to (i.e., occurs at the same time as) a maximum observed acceleration with in the powertrain 12 during the tip-in. The acceleration within the powertrain 12 may be observed via any one of the sensors 38. However, it may be desirable to observe the acceleration within the powertrain 12 specifically at the input to the transmission 16 (i.e., shaft 22) or at the output of the transmission 16 (i.e., shaft 20). Alternatively, the observed acceleration may be an average of the acceleration within the powertrain 12 at one or more of the sensors 38 compensated for any gear ratio difference between an input and output of the transmission 16.

The lash angle within the powertrain 12 may be observed by measuring the speed of the powertrain 12 at two different locations via two of the sensors 38 during a time window of the lash crossing followed by determining the integral of a speed difference within the powertrain at the two different locations. The speed differences may be adjusted to compensate for any gear ratio between the input and output of the transmission 16. The time window may be initiated at the start of the tip-in (i.e., with the depression of the accelerator pedal 34) and may end when the speed difference within the powertrain at the two different locations is zero (once compensation for any gear ratio between the input and output of the transmission 16 is accounted for). The two speed measurements may be taken at any location within the powertrain 12 via any one of the sensors 38. However, it may be desirable to observe the speed two measurements within the powertrain 12 specifically at the input to the transmission 16 (i.e., shaft 22) and the output of the transmission 16 (i.e., shaft 20).

The control strategy 100 next moves on to block 106 (which may occur concurrently with block 104), where the controller 32 generates a signal indicative of an end of the lash crossing during the tip-in in response to the powertrain 12 obtaining a base value of a desired powertrain end of lash angle. The desired powertrain end of lash angle may be lash exit angle where the controller 32 transitions from an in-lash control strategy to an out-of-lash control strategy for various vehicle components, such as the powerplant 14. The desired powertrain end of lash angle may also simply be referred to as the desired powertrain lash angle. The desired powertrain end of lash angle may be a value that is stored within the controller 32. The current value of the desired end of lash angle may be referred to as the base value of the desired end of lash angle. When the base value of the desired end of lash angle is obtained, the controller 32 may facilitate a change in a torque and/or power control strategy for the powerplant 14 of the vehicle 10. Once the base value of the desired end of lash angle has been obtained, the control strategy 100 moves on to block 108 where the torque and/or power output of the powerplant 14 of the powertrain 12 is adjusted via the controller 32. The adjustment of the torque and/or power of the power plant 14 may be a change in control strategy, a switch within the controller 32 from a first torque schedule to a second torque schedule, a switch from an anti-jerk torque schedule to a driver demanded torque and/or power, etc. An anti-jerk torque schedule is a control strategy that limits the amount of torque and/or power output of the powerplant 14 to less than the desired values based the driver demanded torque and/or power, especially during a lash crossing.

Next, the control strategy 100 moves on to decision block 110 where the controller 32 determines if conditions require an adjustment to the desired end of lash angle. If it is determined that the conditions require an adjustment to the desired end of lash angle, the method moves on to block 112 where the desired end of lash angle stored within the controller 32 is adjusted from the base value to an adjusted value based on the observed powertrain lash angle that corresponded to the maximum observed acceleration with in the powertrain 12 during the tip-in. More specifically, desired end of lash angle is adjusted from the base value to an adjusted value based on a difference between the observed powertrain lash angle that corresponded to the maximum observed acceleration with in the powertrain 12 during the tip-in and the base value of the desired end of lash angle. Even more specifically, the adjusted value may be equal to the base value plus the difference between the observed powertrain lash angle that corresponded to the maximum observed acceleration with in the powertrain 12 during the tip-in and the base value of the desired end of lash angle multiplied by at least one weighting factor. The adjusted value of the end of lash angle may be represented by equation (1):

$$\theta_{adj} = \theta_{base} + (\theta_{max\ acc} - \theta_{base}) \cdot W \qquad (1)$$

Where $\theta_{adj}$ is the adjusted value of the end of lash angle, $\theta_{base}$ is the base value of the end of lash angle, $\theta_{max\ acc}$ is the observed powertrain lash angle that corresponded to the maximum observed acceleration with in the powertrain 12 during the tip-in, and W is the product of one or more weighting factors.

Returning to decision block 110, if the controller 32 determines that the conditions are such that an adjustment to the desired end of lash angle is not required or is not desirable, the control strategy 100 moves on to block 114 where the controller 32 overrides any adjustment to the desired end of lash angle that may occur at block 112 such that the stored value of the desired end of lash angle within the controller 32 remains at the base value $\theta_{base}$. Conditions that may result in overriding any adjustment to the desired end of lash angle that may occur at block 112 may be communicated to the controller 32 and may include, but are not limited to, a gear shift occurring within the transmission 16 of the powertrain 12 during the tip-in, detection of rough road conditions during the tip-in, the driver demanded torque being less than a threshold during the tip-in, the torque and/or power output of the powerplant 14 being greater than a threshold during the tip-in, or a percentage of previous tip-ins not resulting in an adjustment to the desired end of lash angle exceeding a threshold.

Returning to block 112, once the end of lash angle has been adjusted from the base value to the adjusted value, the control strategy 100 moves on to decision block 116 where it is determined if a subsequent tip-in that results in a torque direction reversal within the powertrain 12 has occurred. If a subsequent tip-in that results in a torque direction reversal within the powertrain 12 has not occurred, the control strategy 100 recycles back to the beginning of block 116. If a subsequent tip- and that results in a torque direction reversal within the powertrain 12 has occurred, the control strategy 100 moves on to block 118 where the controller 32 generates a signal indicative of an end of the lash crossing during the subsequent tip-in response to the powertrain 12 obtaining the adjusted value of the desired powertrain end of lash angle. Once the adjusted value of the desired end of lash angle has been obtained, the control strategy 100 moves on to block 120 where the torque and/or power output of the powerplant 14 of the powertrain 12 is adjusted, which is commanded by the controller 32. The adjustment of the torque and/or power may be a change in control strategy, a switch within the controller 32 from a first torque schedule to a second torque schedule, a switch from an anti-jerk torque schedule to a driver demanded torque and/or power, etc. It should be understood that the flowchart depicted in FIGS. 2A and 2B is for illustrative purposes only and that the control strategy 100 should not be construed as limited to the flowchart depicted in FIGS. 2A and 2B. Some of the steps of the control strategy 100 may be rearranged while others may be omitted entirely.

Figure 3:
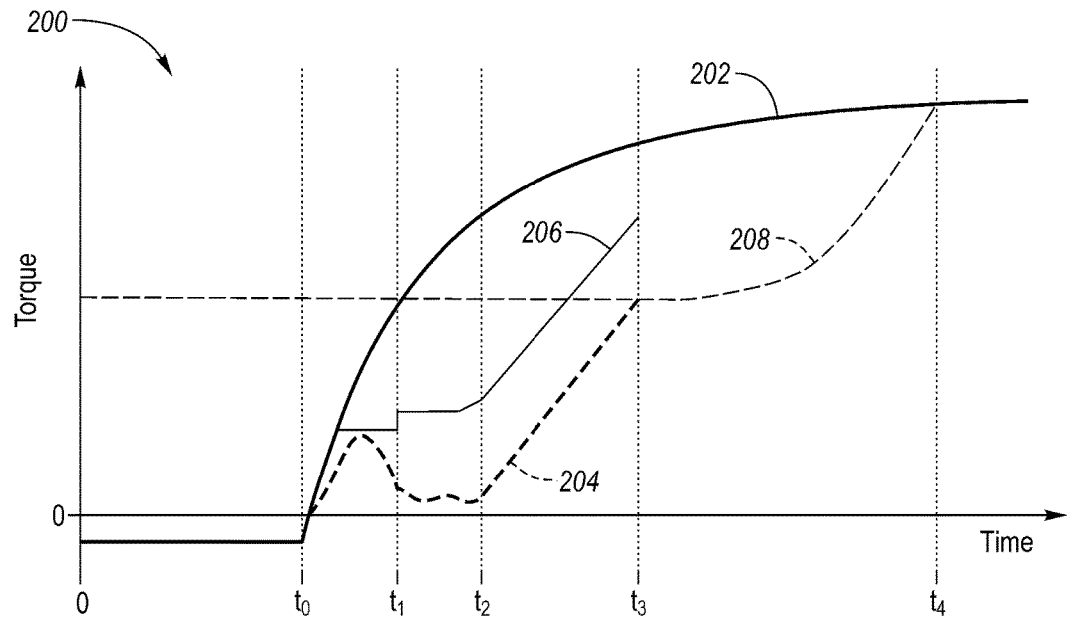
FIG. 3 is a graph illustrating a powerplant torque control strategy during a lash crossing.

Referring to FIG. 3, a graph 200 of a torque control strategy for the powerplant 14 during a lash crossing is illustrated. The graph illustrates torque vs. time during a tip-in. The driver demanded torque is illustrated by line 202, a first controlled torque path is illustrated by line 204, a second controlled torque path is illustrated by line 206, and a torque output emission limit is illustrated by line 208. The first controlled torque path 204 may be referred to as the "fast path" torque control. The first controlled torque path 204 is an actual output torque of the powerplant 14 when controlled according to a strategy that includes adjusting the ignition timing of the powerplant 14 (i.e., when the powerplant 14 is an internal combustion engine). Adjusting the ignition timing of an engine may involve retarding or advancing spark within the cylinders of the engine to increase or decrease torque. The second controlled torque path 206 may be referred to as the "slow path" torque control. The second controlled torque path 206 is an actual output torque of the powerplant 14 when controlled according to a strategy that includes adjusting a position of a throttle valve in order to increase or decrease the torque of the powerplant 14 (i.e., when the powerplant is an internal combustion engine and the throttle valve is the intake valve that allows fuel and air to enter into the cylinders of the engine).

Beginning at time $t_0$ the driver demanded torque 202 is quickly increased from a negative value to a positive value shortly after time $t_0$ resulting in a torque direction reversal within the powertrain 12. Between times $t_1$ and $t_2$ the powertrain 12 experiences a lash crossing. During the lash crossing between times $t_1$ and $t_2$, the controlled torque paths, whether it be the first controlled torque path 204 or the second controlled torque path 206, are limited such that the output torque of the powerplant 14 remains relatively constant or is increased at a small rate to facilitate a smooth transition through the lash crossing in order to reduce NVH within the powertrain 12. Once the lash crossing is complete at time $t_2$, the controlled torque paths (204 and 206) are ramped or increased at an increased rate, relative to the rate of increase during the lash crossing between times $t_1$ and $t_2$, towards the driver demanded torque 202. The transition that occurs at time $t_2$ corresponds to the torque adjustment at blocks 108 and 120 in FIGS. 2A and 2B, respectively, where the torque output of the power plant 14 is adjusted from a first torque schedule to a second torque schedule, from an anti-jerk torque schedule to a driver demanded torque, etc.

The controlled torque paths (204 and 206) are then ramped or increased at the increased rate (beginning at time $t_2$) until the torque output of the powerplant 14 reaches the driver demanded torque 202. The controlled torque paths (204 and 206) of the powerplant 14, alternatively, may be limited after time $t_2$ by the torque output emission limit 208. If the controlled torque paths (204 and 206) of the powerplant 14 intersect the torque output emission limit 208 the rate at which the torque of powerplant increases will follow the torque output emission limit 208 from the point of intersection until the torque output of the powerplant 14 reaches the driver demanded torque 202 at time $t_4$.

Figure 4:
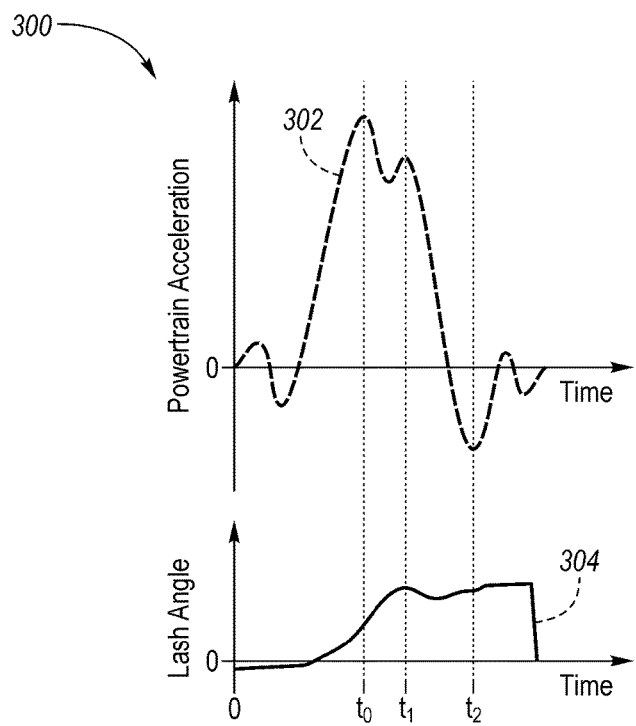
FIG. 4 is a graph illustrating powertrain acceleration and lash angle during a lash crossing.

Referring to FIG. 4, a graph 300 of the acceleration 302 of the powertrain 12 and the lash angle 304 during a tip-in that results in a torque direction reversal within the powertrain 12 is illustrated. The acceleration 302 of the powertrain 12 occurring at time $t_0$ corresponds to the maximum acceleration occurring during the tip-in and the lash angle occurring at time $t_0$ is the observed powertrain lash angle that corresponds to the maximum observed acceleration within the powertrain $\theta_{max\ acc}$ during the tip-in utilized in equation (1) above. The control strategy determines the maximum acceleration occurring during the tip-in by determining the largest peak to valley change in acceleration within the powertrain 12 during the tip-in. The peak value of the largest peak to valley change in acceleration 302 will correlate with the maximum acceleration $\theta_{max\ acc}$ during the tip-in. The valley value of the largest peak to valley change in acceleration 302 will correlate with a minimum acceleration during the tip-in. In the example graph 300 of FIG. 4 the largest peak to valley occurs between time $t_0$ and time $t_2$, with the acceleration 302 occurring at time $t_0$ being the highest peak and therefore the maximum acceleration $\theta_{max\ acc}$ that occurred during the tip-in. By utilizing the largest peak to valley relationship to determine the maximum acceleration that occurred during the tip-in, the control strategy will ignore any outlier peaks in acceleration that may be less than the maximum acceleration of the powertrain that occurred during the tip-in. For example, the control strategy will ignore the peak value occurring at time $t_1$ and correctly assign the peak acceleration to the value occurring at time $t_0$.

Figure 5:
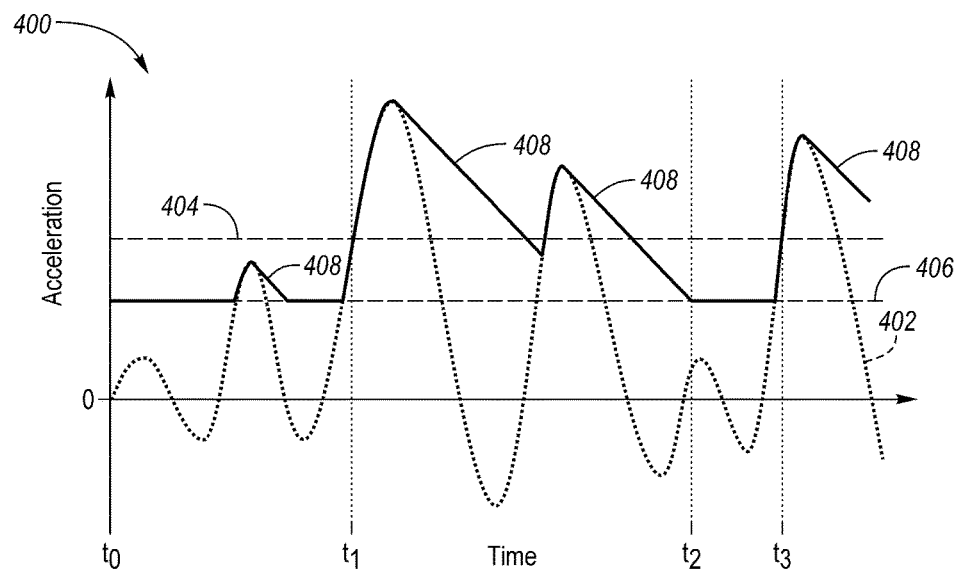
FIG. 5 is a graph illustrating the detection of rough road conditions.

Referring to FIG. 5, a graph 400 illustrating the detection of rough road conditions is depicted. Specifically, the graph 400 illustrates the acceleration 402 of the powertrain 12 vs. time. More specifically line 402 may represent the acceleration of the powertrain 12 at the output of the transmission 16 (i.e., shaft 20). The acceleration 402 of the powertrain 12 is shown to oscillate several times over the duration of time shown in the graph 400. If it any time the acceleration 402 exceeds an upper limit 404, the vehicle 10 is said to be experiencing rough road conditions. The vehicle 10 will be said to continue experiencing rough road conditions until the acceleration 402 of the powertrain 12 drops below a lower limit 406 that is less than the upper limit 404. The difference between the upper limit 404 and the lower limit 406 creates a hysteresis that prevents repeated switches between states of experiencing rough road conditions and states of not experiencing rough road conditions. The logic for determining whether or not the vehicle 10 is in a state of experiencing rough road conditions or a state of not experiencing rough road conditions may be stored as control logic within the controller 32. The control logic may further include slope limiters 408 that delay what the controller 32 recognizes as the current acceleration of the powertrain 12 once there is a drop in acceleration from a peak value in order to further decrease repeated switches between states of experiencing rough road conditions and states of not experiencing rough road conditions.

In the example graph 400, the vehicle is said to be in a state of not experiencing rough road conditions between times $t_0$ and $t_1$ and between times $t_2$ and $t_3$. Also, in the example graph 400, the vehicle is said to be in a state of experiencing rough road conditions between times $t_1$ and $t_2$ and after time $t_3$. If the controller 32 determines that the vehicle 10 was in a state of experiencing rough road conditions during a tip-in the results in a torque direction reversal within the powertrain 12, the control strategy 100 depicted in FIGS. 2A and 2B will proceed according to block 114 where the controller 32 will override any adjustment to the desired end of lash angle that may occur at block 112.

Figure 6:
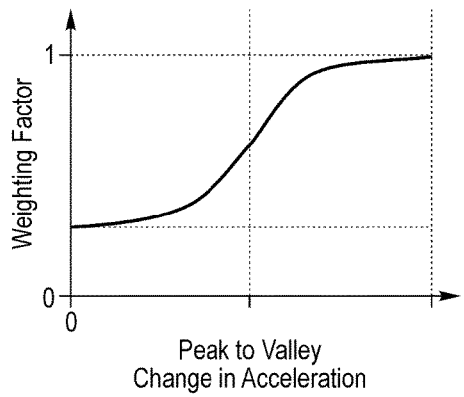
FIG. 6 is a graph illustrating a first weighting factor for an adjustment to an end of lash angle.

Referring to FIG. 6, a graph 500 of a first weighting factor 502 for the adjustment to the end of lash angle occurring in block 112 of the control strategy depicted in FIGS. 2A and 2B is illustrated. The first weighting factor 502 is based on the largest peak (maximum powertrain acceleration) to valley (minimum powertrain acceleration) change in acceleration within the powertrain 12 during the tip-in that is illustrated in FIG. 4. As the largest peak to valley change in acceleration increases along the horizontal axis of graph 500, the first weighting factor 502 increases along the vertical axis. The first weighting factor 502 has a value that increases from zero or a fractional value that is greater than zero toward a value of one as the largest peak to valley change in acceleration increases along the horizontal axis of graph 500.

Figure 7:
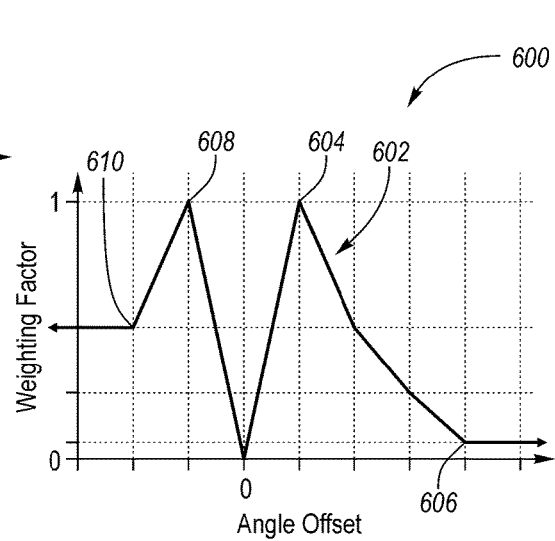
FIG. 7 is a graph illustrating a second weighting factor for an adjustment to an end of lash angle.

Referring to FIG. 7, a graph 600 of a second weighting factor 602 for the adjustment to the end of lash angle occurring in block 112 of the control strategy depicted in FIGS. 2A and 2B is illustrated. The graph in FIG. 7 is for exemplary purposes only. The weighting factor 602 may be adjusted and is calibratable to specific needs of a particular design. For example, the weighting factor could be set up as a monotonically increasing function or as a constant value. The second weighting factor 602 is based on an angle offset. The angle offset may correspond to the difference between the observed powertrain lash angle that corresponded to the maximum observed acceleration with in the powertrain 12 during the tip-in and the base value of the end of lash angle (i.e., $\theta_{max\ acc} - \theta_{base}$). The second weighting factor 602 may increase from zero at a zero-angle offset to one at first positive 604 value of the angle offset. The second weighting factor 602 may then gradually decrease to a zero or a fractional value that is greater than zero as the angle offset increases from the first positive value 604 to a second positive value 606. The second weighting factor 602 may remain at the zero or fractional value as the angle offset increases to values greater than the second positive value 606. The second weighting factor 602 may increase from zero at a zero-angle offset to one at first negative value 608 of the angle offset. The second weighting factor 602 may then gradually decrease to a zero or a fractional value that is greater than zero as the angle offset decreases from the first negative value 608 to a second negative value 610. The second weighting factor 602 may remain at the zero or fractional value as the angle offset decrease to values less than the second negative value 610. If the second weighting factor 602 has fractional values at the second positive value 606 and the second negative value 610, the value of the second weighting factor 602 at the second negative value 610 may be greater than the value of the second weighting factor 602 at the second positive value 606. The W variable in equation (1) above may represent the first weighting factor 502 alone, the second weighting factor 602 alone, or the product (multiplication) of the first weighting factor 502 and the second weighting factor 602.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
    a powertrain including a powerplant; and
    a controller programmed to,
        responsive to a tip-in resulting in a powertrain torque direction reversal and upon obtaining a base value of a desired powertrain lash angle, adjust a powerplant torque schedule, and
        subsequently adjust the desired powertrain lash angle from the base to an adjusted value based on an observed powertrain lash angle that corresponds to a maximum powertrain acceleration during the tip-in.

2. The vehicle of claim 1, wherein the controller is further programmed to, responsive to a subsequent tip-in resulting in a second powertrain torque direction reversal and upon obtaining the adjusted value of the desired powertrain lash angle, adjust the powerplant torque schedule.

3. The vehicle of claim 2, where the powerplant torque schedule is adjusted from an anti-jerk torque schedule to a driver demanded torque.

4. The vehicle of claim 1, wherein the desired powertrain lash angle is adjusted from the base to the adjusted value based on a difference between the observed powertrain lash angle and the base value.

5. The vehicle of claim 4, wherein the desired powertrain lash angle is adjusted from the base to the adjusted value based on a weighting factor multiplied the difference, wherein the weighting value increases as the difference increases from a first to a second value, and wherein the weighting value decreases as the difference increases from the second to a third value.

6. The vehicle of claim 4, wherein the desired powertrain lash angle is adjusted from the base to the adjusted value based on a weighting factor multiplied the difference, wherein the weighting value increases as a difference between the maximum powertrain acceleration and minimum powertrain acceleration observed during the tip-in increases.

7. The vehicle of claim 1, wherein the controller is further programmed to, responsive to a gear shift within a transmission of the powertrain during the tip-in, override adjusting the desired powertrain lash angle from the base to the adjusted value.

8. The vehicle of claim 1, wherein the controller is further programmed to, responsive to detection of rough road conditions during the tip-in, override adjusting the desired powertrain lash angle from the base to the adjusted value.

9. The vehicle of claim 1, wherein the controller is further programmed to, responsive to a driver demanded torque being less than a threshold during the tip-in, override adjusting the desired powertrain lash angle from the base to the adjusted value.

10. The vehicle of claim 1, wherein the controller is further programmed to, responsive to a torque output of the powerplant being greater than a threshold during the tip-in, override adjusting the desired powertrain lash angle from the base to the adjusted value.

11. A method comprising:
    responsive to a tip-in resulting in a torque direction reversal in a vehicle powertrain, increasing powertrain torque according to an anti-jerk schedule;
    responsive to obtaining a desired powertrain lash angle, adjusting the powertrain torque from the anti-jerk schedule to a driver demanded torque; and
    adjusting the desired powertrain lash angle during a subsequent tip-in based on an observed powertrain lash angle that corresponds to a maximum powertrain acceleration observed during the tip-in.

12. The method of claim 11, wherein the desired powertrain lash angle is adjusted during the subsequent tip-in from a base to an adjusted value based on a difference between the observed powertrain lash angle and the base value.

13. The method of claim 12, wherein the desired powertrain lash angle is adjusted from the base to the adjusted value based on a weighting factor multiplied the difference, wherein the weighting value increases as the difference increases from a first to a second value, and wherein the weighting value decreases as the difference increases from the second to a third value.

14. The method of claim 12, wherein the desired powertrain lash angle is adjusted from the base to the adjusted value based on a weighting factor multiplied the difference, wherein the weighting value increases as a difference between the maximum powertrain acceleration and minimum powertrain acceleration observed during the tip-in increases.

15. A method comprising:
    responsive to a desired powertrain lash angle obtaining a base value during a tip-in, signaling an end of a lash crossing;
    adjusting the desired powertrain lash angle from the base to an adjusted value based on a maximum powertrain acceleration observed during the tip-in; and responsive to the desired powertrain lash angle obtaining the adjusted value during a subsequent tip-in, signaling the end of the lash crossing.

16. The method of claim 15 further comprising, responsive to the desired powertrain lash angle obtaining the base value during the tip-in, adjusting powertrain torque from an anti-jerk schedule to a driver demanded torque.

17. The method of claim 16 further comprising, responsive to the desired powertrain lash angle obtaining the adjusted value during the subsequent tip-in, adjusting powertrain torque from the anti-jerk schedule to the driver demanded torque.

18. The method of claim 15, wherein the desired powertrain lash angle is adjusted from the base to the adjusted value based on a difference between the observed powertrain lash angle that corresponds to the maximum powertrain acceleration and the base value.

19. The method of claim 18, wherein the desired powertrain lash angle is adjusted from the base to the adjusted value based on a weighting factor multiplied the difference, wherein the weighting value increases as the difference increases from a first to a second value, and wherein the weighting value decreases as the difference increases from the second to a third value.

20. The method of claim 18, wherein the desired powertrain lash angle is adjusted from the base to the adjusted value based on a weighting factor multiplied the difference, wherein the weighting value increases as a difference between the maximum powertrain acceleration and minimum powertrain acceleration observed during the tip-in increases.

* * * * *